July 8, 1930.　　　　G. POSNICK　　　　1,770,042
SELF SERVICE APPARATUS
Filed Sept. 16, 1924　　8 Sheets-Sheet 1
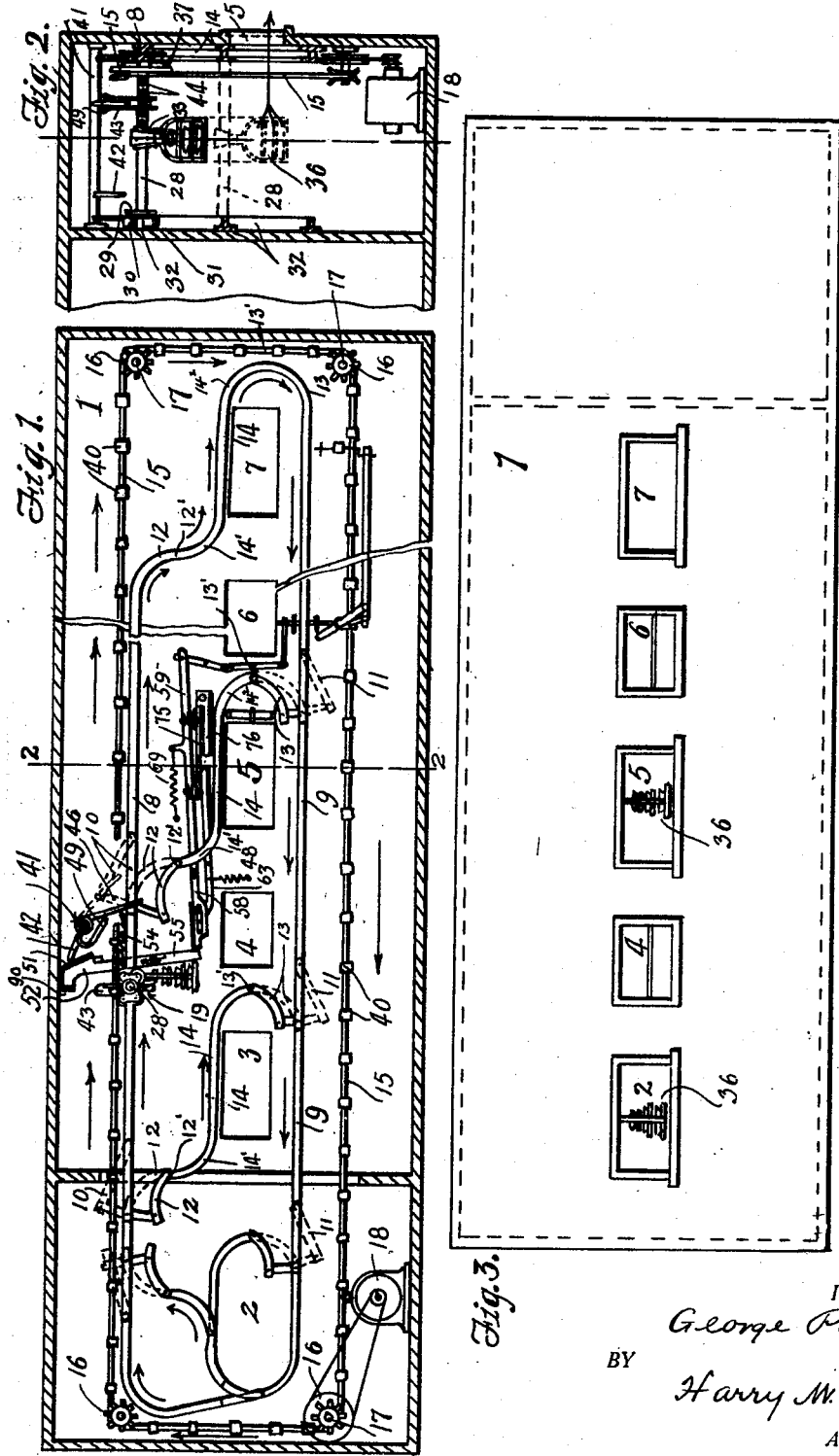
INVENTOR.
George Posnick.
BY
Harry M. Bowen.
ATTORNEY.

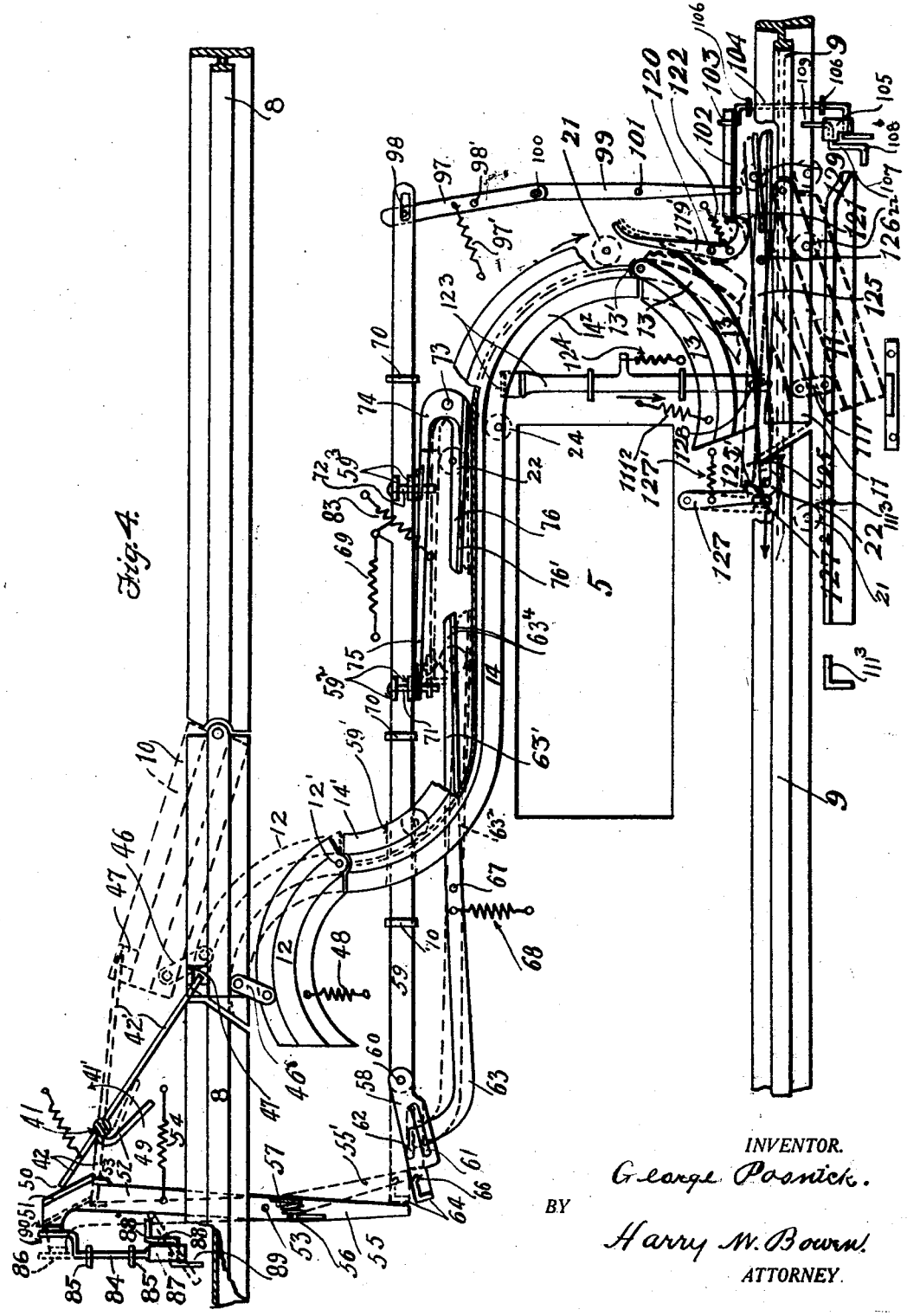

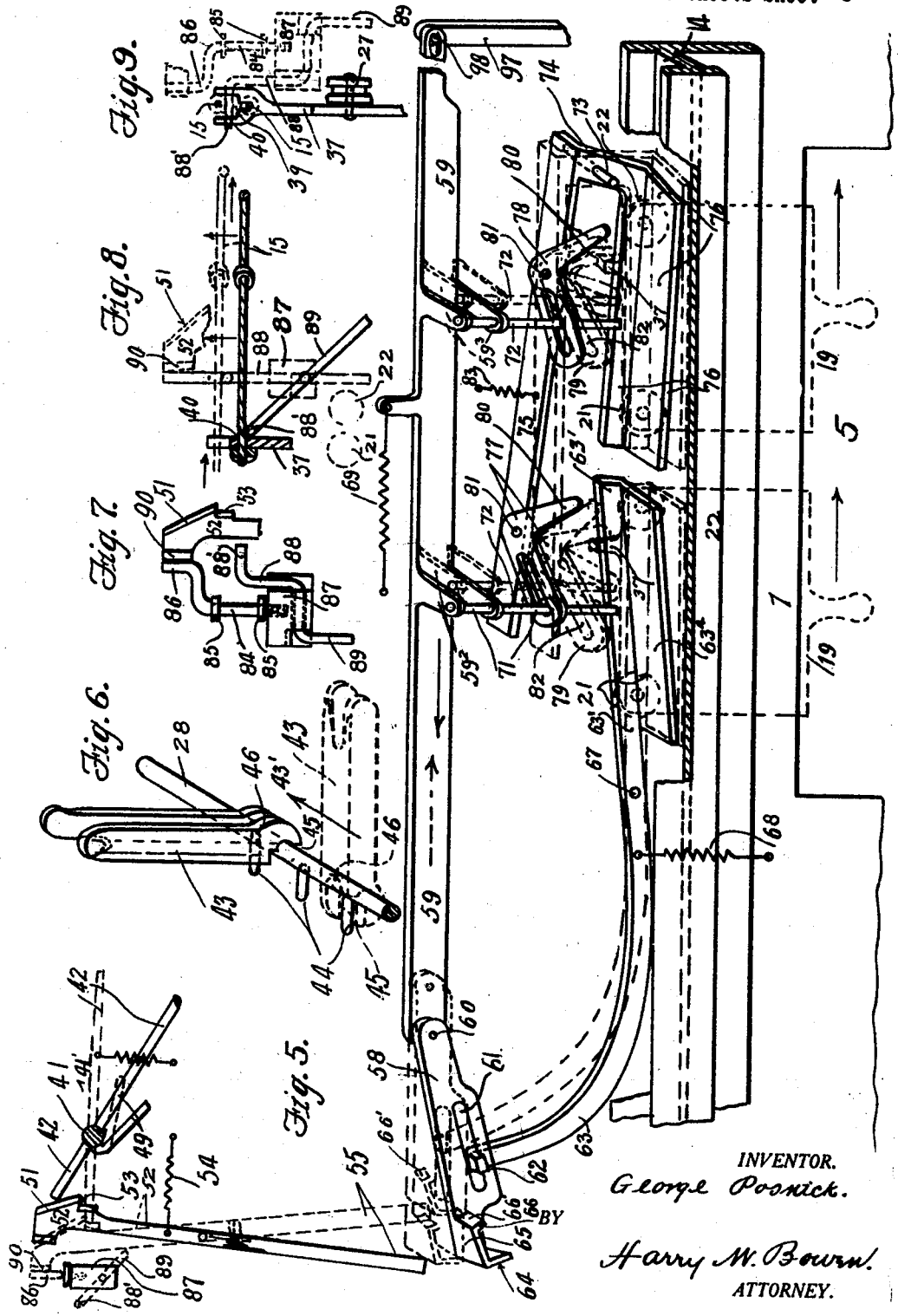

July 8, 1930.  G. POSNICK  1,770,042
SELF SERVICE APPARATUS
Filed Sept. 16, 1924   8 Sheets-Sheet 4
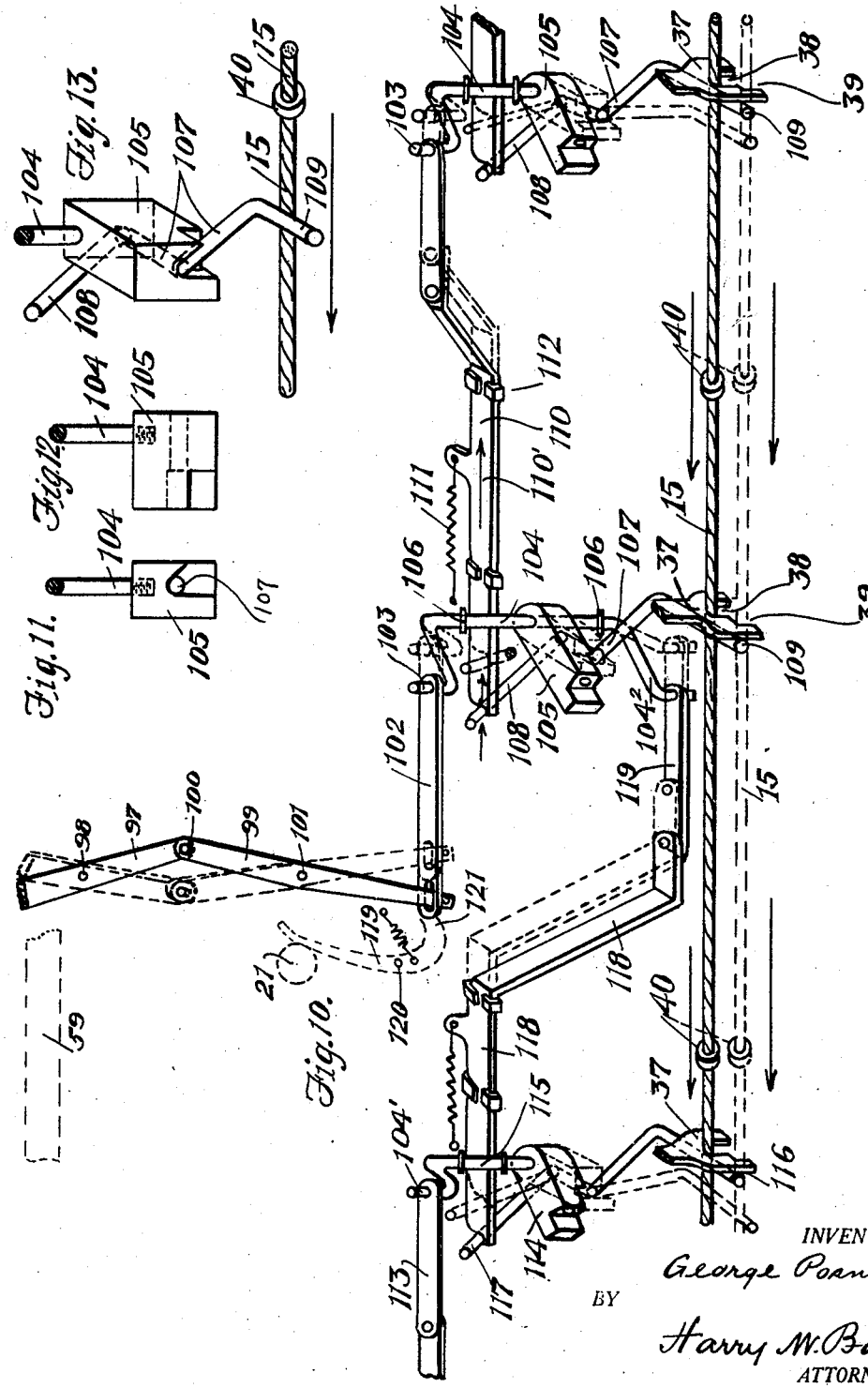
INVENTOR.
George Posnick
BY
Harry N. Bown.
ATTORNEY.

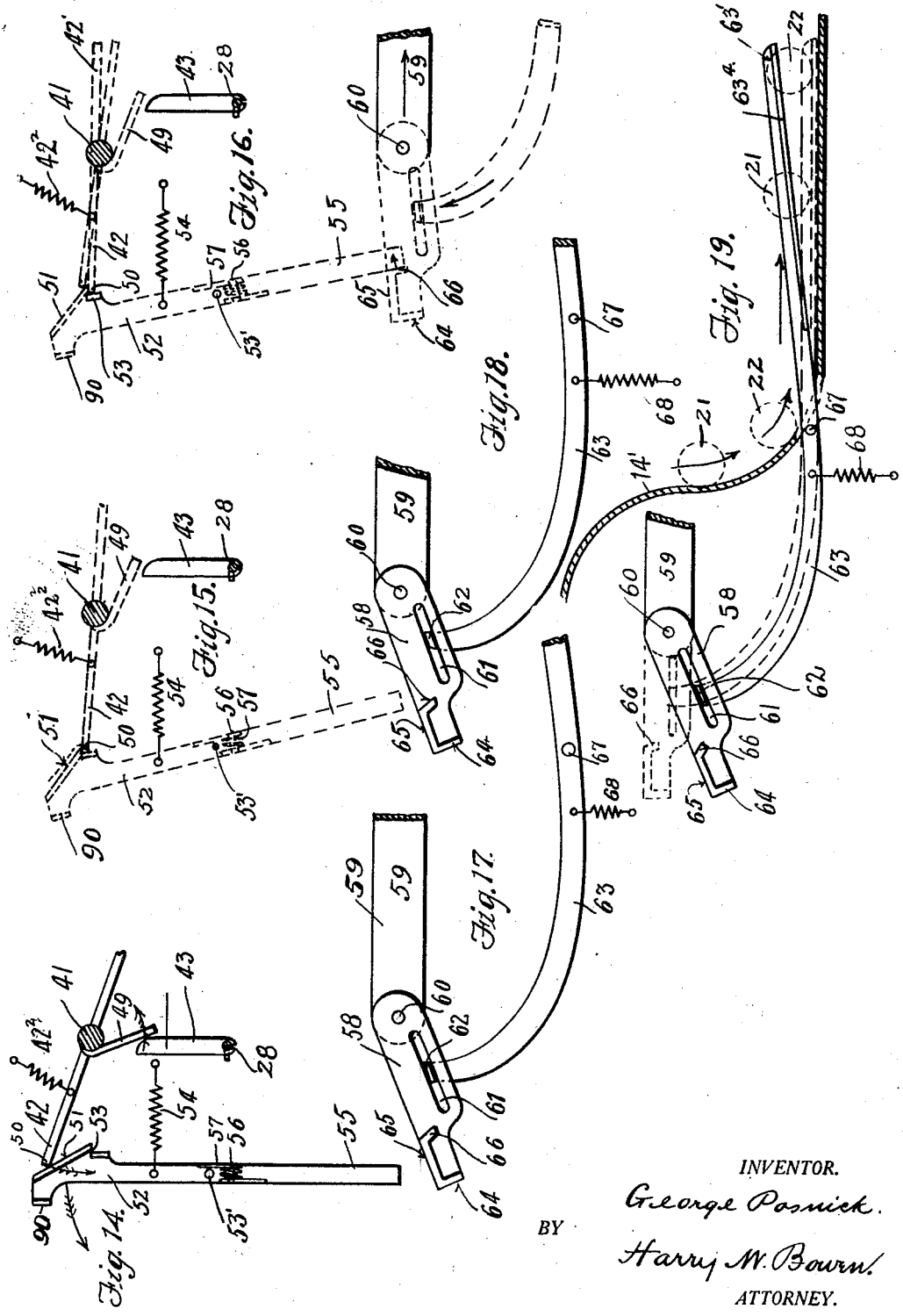

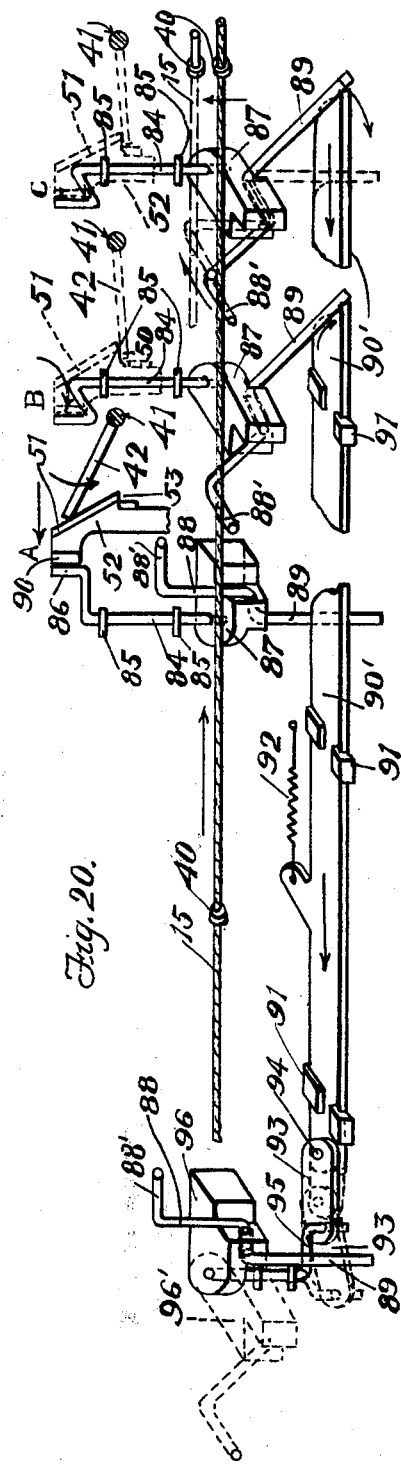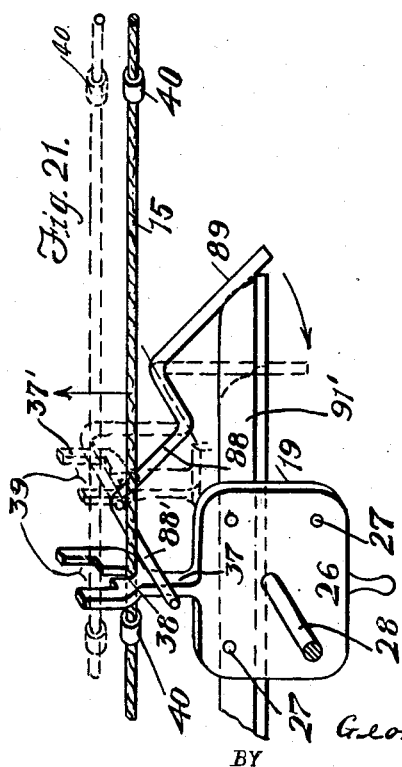

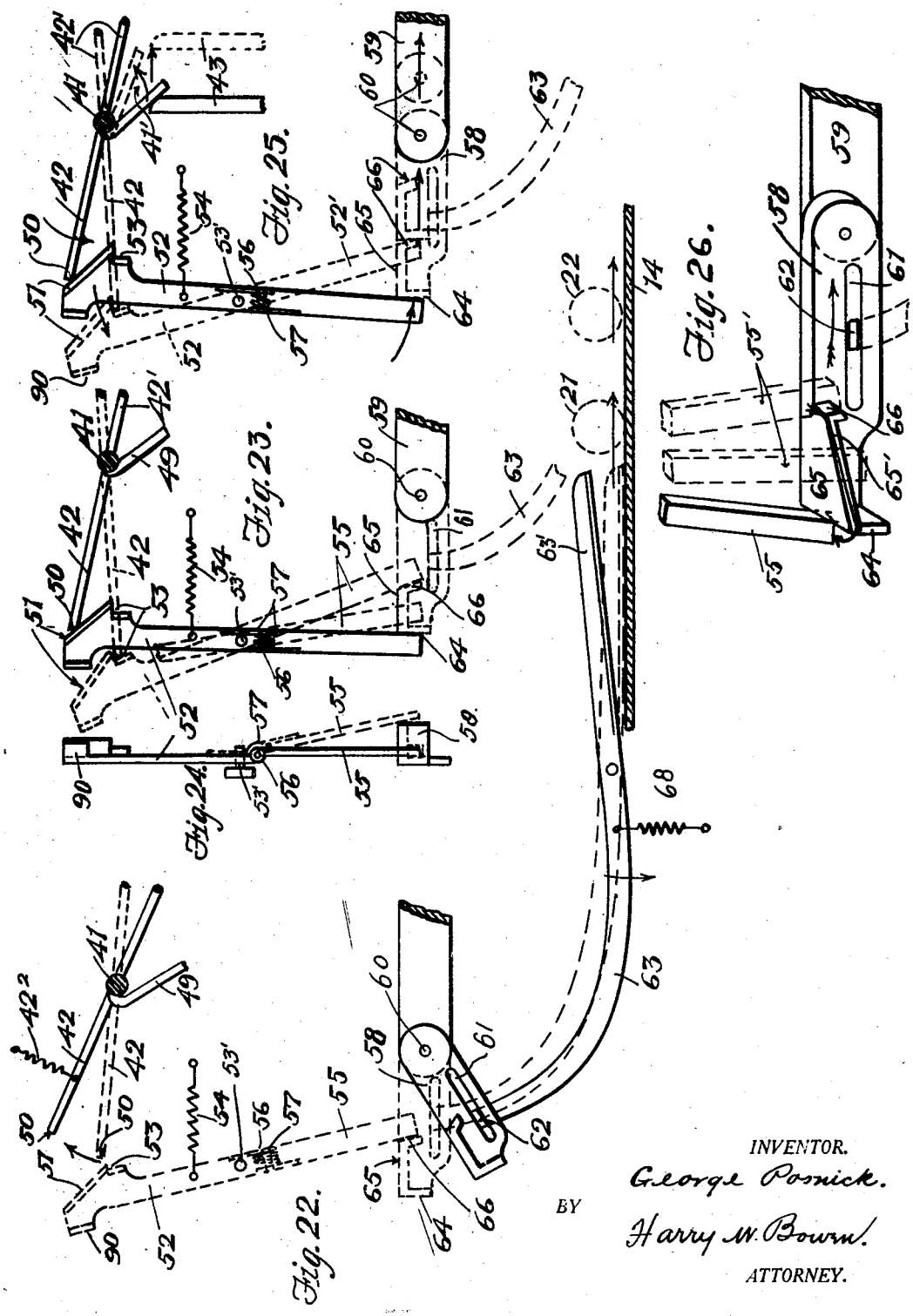

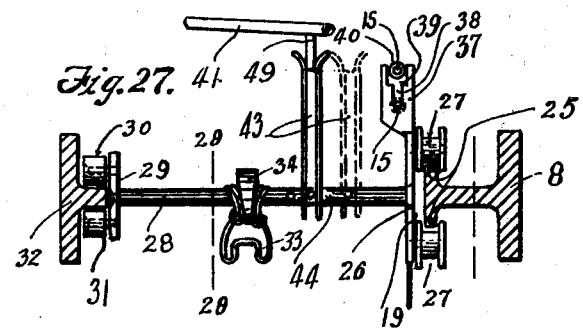
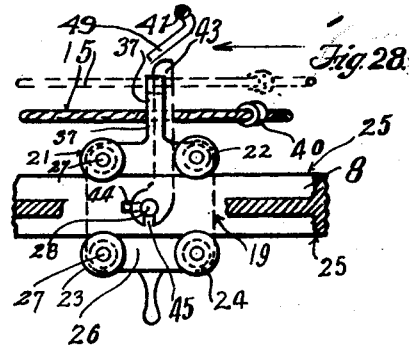
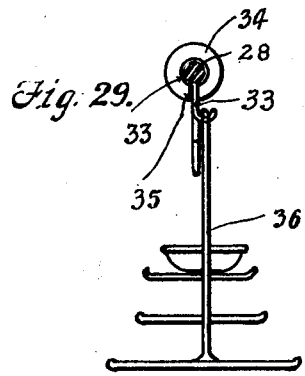
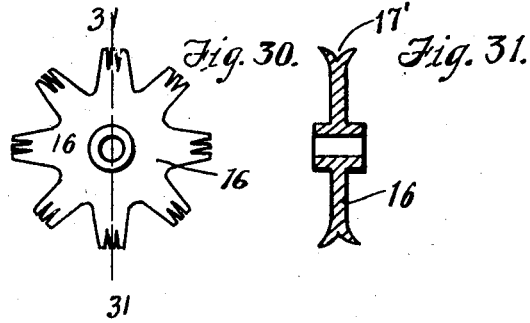
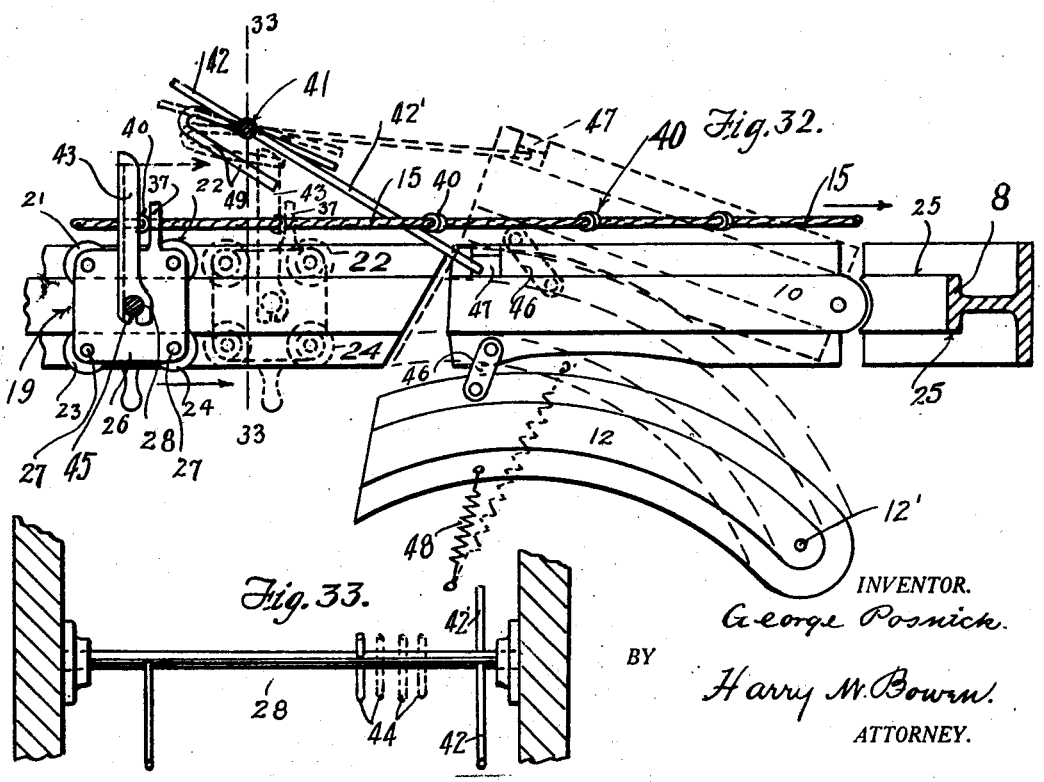

Patented July 8, 1930

1,770,042

UNITED STATES PATENT OFFICE

GEORGE POSNICK, OF BROOKLYN, NEW YORK

SELF-SERVICE APPARATUS

Application filed September 16, 1924. Serial No. 738,079.

This invention relates to improvements in devices for serving food in restaurants or other eating places or what is sometimes termed self service outfits.

An object of the invention is to provide a continuous traveling mechanism that will quickly serve food to a large number of persons so that they will not be long detained after giving their order.

Broadly, it comprises a continuously traveling belt member as an endless rope or like structure which is provided with suitably spaced devices for engaging a carrier member on which the food is placed. This carrier is designed to be supported by and for traveling on a suitable track. The track is arranged adjacent several openings or windows, through which the person to be served receives the food which is automatically brought to the windows by means of the continuously traveling rope. Means is provided for automatically causing the carrier on which the food is placed to assume a position of rest at a particularly designated window or opening as will be described.

Means is also provided for causing the carriers to be automatically returned to the room where the food is prepared after the customer's order has been served.

Means is further provided for automatically preventing a carrier being returned, if another one should happen to be located on the track in a position that is immediately ahead of the second or other carriers.

Further objects and nature of the invention will appear in the body of the specification and claims.

Referring to the drawings:—

Fig. 1 is a side elevational view showing the general arrangement and location of the apparatus with the parts in their normal position, and illustrating several stations where the food is to be served.

Fig. 2 is an end view of Fig. 1 taken on a plane represented by the line 2—2 of Fig. 1 with some of the parts omitted showing the oppositely located track for supporting the travelling carrier. This view shows the food trays and carrier located opposite one of the delivery windows or openings.

Fig. 3 is a view similar to Fig. 1 with the mechanism omitted and showing only the openings through which the food is delivered.

Fig. 4 is an enlarged detail view showing the operative parts adjacent one of the serving openings or windows and with the parts in full lines which represent their normal positions, the dotted lines represent their second positions.

Fig. 5 is a view showing the position of the parts after a carrier has moved down the curved track and assumed a position of rest opposite one of the openings. The full lines representing the normal position and the dotted lines, position after the carrier has come to rest and the carrier locking mechanism has been operated.

Fig. 6 is a detail view of the carrier shaft showing the arm thereon for adjustment in different longitudinal positions on the shaft for the purpose of causing the carrier to be conveyed to the proper window opening.

Fig. 7 is a detail view of the upper end of the mechanism for operating a switch part of the track and for elevating the endless rope from its normal traveling position upward, and a stop for a carrier.

Fig. 8 is a view similar to Fig. 7 showing the operative position.

Fig. 9 is a front elevational and partial view of the carrier in a position when the rope is being elevated.

Fig. 10 is an enlarged detail view of the locking mechanism in full and dotted lines for retaining the carriers against movement by the belt when there is a carrier ahead of it.

Figs. 11, 12, and 13 are detail views of the device for automatically depressing the carrier rope, when it is desired to retain the carrier in a position to prevent its traveling forward and interfering with another carrier.

Fig. 14 is a view showing the normal position and the parts that operate the switch section of the track and the carrier locking devices.

Fig. 15 shows the position of the parts at the time when by the operation of the carrier the switch has been moved and locked.

Fig. 16 shows the position of these parts at the moment of locking the parts which moves the switch section of track into its operative position and locks the carrier locking devices.

Figs. 17, 18, and 19 are detail views of structures which cooperate with the parts shown in Figs. 14, 15, and 16 when a carrier enters and passes down the curved part of the track.

Fig. 20 is an enlarged detail view showing the parts connected with the locking mechanism illustrated in Figs. 14, 15, 16, 17, 18, and 19 for operating the locking device in advance of the carrier and for elevating the rope for bringing the carrier to rest.

Fig. 21 is a detail view of another position of the parts shown in Fig. 20.

Fig. 22 is a view showing the connecting mechanism between the locking latch and a movable part of the track in their normal position in front of one of the openings of the section of track at an opening.

Fig. 23 is a side view of the parts in one position.

Fig. 24 is an end view of Fig. 23 illustrating the locking positions of the locking device and the end of the spring actuated latch passing around the shoulders of the track portion.

Fig. 25 is another view of the parts shown in Fig. 23.

Fig. 26 is an enlarged detail view in perspective showing the locking plate passing around the shoulders of the track portion at an opening.

Fig. 27 is a view illustrating the carrier and the two supporting tracks and illustrating in dotted lines the adjusted position of the part on the carrier for causing the carriers to go to the different serving stations, as desired.

Fig. 28 is a side elevational view of Fig. 27 on the line 28—28 of Fig. 27.

Fig. 29 is a detail view of the member for supporting the trays or dishes on which the food is placed.

Fig. 30 is a detail view of one of the supporting wheels on which the endless belt travels.

Fig. 31 is a sectional view on the line 31—31 of Fig. 30.

Fig. 32 is a side elevational view on an enlarged scale showing the operative means for moving the switch part of the track, into an operative or dotted line position, and Fig. 33 is a view substantially on the line 33—33 of Fig. 32 showing the rotatable shaft which operates the switch section of the tracks.

Referring to the drawings in detail:

1 designates the panel or partition boards of the restaurant or other room where the food is to be served having a series of openings in this partition. 2 may designate the point where the food is prepared and the remaining openings where it is to be delivered or served. The view in Fig. 1 shows the mechanism arranged adjacent one of the serving openings having the reference numeral 5. The upper runway portion of the main track is designated at 8 and the lower main portion at 9. The main track is provided with a movable section 10 opposite each of the delivery openings and the track 9 is provided with a movable section 11 at each of the openings. Cooperating with the upper and lower portions of the main track are the switch sections 12, and 13. 14 is an —S— shaped portion of track at each of the openings 3, 4, 5, etc, the upper end of which has pivotally connected thereto the switch sections 12 at 12' and its lower end the switch sections 13 at 13'. (See Figs. 4 and 32.) Passing around the upper and lower portions of the main track 8 and 9 is the traveling belt 15 which is supported on the four wheels 16, a detail of one of which is shown in Figs. 30 and 31. These wheels are mounted on shafts 17 and are formed with the spoke portions in the outer ends of which are the grooves 17' for receiving and supporting the traveling belt 15. A suitable motor 18 is connected to a shaft on which one of the wheels 16 is secured. The main upper and lower trackways 8 and 9 are formed —T— shaped as illustrated in Figs. 4, 5, 24, 32, and 27. The carrier 19 that runs on this trackway as shown in the enlarged views in Figs. 27 and 28 is provided with the four rollers 21, 22, 23, and 24, two of which are located above and two below the tread portions 25 of the track. 26 is a plate to which the rollers are attached by means of the pins or shafts 27. Secured to the plate 26 is a rod 28. On the outer end of this rod is secured the plate 29 to which is secured the carrier rollers 30 and 31. These rollers travel on the oppositely located —T— shaped track 32 whereby the food carrier 19 is firmly supported at both of its ends. Located on the shaft 28 is a hook member 33 which turns loosely on this shaft and secured to the shaft is a block 34 having the shoulder 35 against which the hook member 33 engages when in normal position for retaining the tray supporting member 36 against swinging movement but permits it to turn on the shaft 28 when the carrier 19 passes down the inclined curved portion 14', and the curved section 12. Attached to the plate 26 is an upwardly extending part 37 having the two slots 38 and 39. The slot 39 being wider than the slot 38. The endless traveling conveyor belt 15 is designed to be received in these slots. When the rope is in the narrow slot 38 the knots 40 of the belt 15 will engage the plate 37 at the sides of this slot and cause the carrier to be drawn along the trackway 25. When the rope is in the wide slot 39, the knots will pass freely through the enlarged slot and the carriers will remain stationary. Devices will be described later for elevating or depressing the rope 15 so that the knots 40 may pass freely through the slots 39.

Rotatably supported in bearings above the main upper portion 8 of the track is a shaft 41 having the oppositely extending rods 42 and 42' secured thereto. Adjustably mounted on the shaft 28 of the carrier plate 26 is an upwardly extending member 43 which is designed to engage the rod 49 depending upon its longitudinal position on the shaft 28 as shown in Fig. 27. The member 43 is shown in an enlarged detail view in Fig. 6. On the shaft 28 are a series of pins 44 spaced from each other for retaining the member 43 in different longitudinal positions on the shaft 28 as indicated by the arrow 43'. The member 43 is formed with a slit as shown at 45 whereby when the member 43 is turned on the shaft 28 so that the pins may pass through the slit it may be moved axially of the shaft 28 into different positions thereon. The member 43 is retained in its vertical position by one of the pins 44 engaging the shoulder 46 whereby one of the rods 49 on the rockable shaft 41 will be engaged by the part 43 and the shaft 41 rotated as the carrier is drawn along by the belt 15. The shoulder 46 prevents the part 43 from being rotated on the shaft 28.

Referring now to the mechanism for permitting the carrier 19 which supports the tray carrying device 36 to permit the food and the trays to stop at one of the openings as 5. The pivotal track section 10 of the upper runway portion 8 is normally in the full line position and when a carrier 19 is to be transferred onto the section of the track 14 above the opening 5, the pivoted curved track section 12 must then be thrown from the full line position into the dotted line position as indicated in Figs. 1, 4, and 32. This is accomplished as follows: The section 10 of the main track 8 is connected to the curved track section 12 by means of the link 46, and the track section 12 is pivotally connected at 12' to the upper curved portion 14' of the part 14. The rod 42' is extended rearwardly and its lower end is located under the bracket or struck-up part 47 of the main track switch or section 10. The curved section 12 is normally retained in the lowered or full line position by means of the coil spring 48.

Also secured to the shaft 41 is a rod 49 previously referred to, which is located in the path of the upwardly extending member 43 which as stated, is adjustably positioned on the shaft 28 so that when the carrier member 19 is drawn along by the continuously traveling rope 15 by a knot 40 engaging the sides of the narrow slot 37 the shaft 41 will be rotated as indicated by the arrow 41', see Figs. 4, 5, and 25. The effect of which is that the rod 42' being located under the struck up bracket 47 of the track section 10 will cause this section of the track to be elevated from the full to the dotted line position and the track section 12 of the shunt track 14 to be elevated into the dotted line position so that it will register or be in line with the upper main trackway 8 permitting the carrier to move downward on the curved part 14' and onto the horizontal part 14 opposite the food serving opening or station 5. As the rod part 42 is moved downward into the dotted line position its extreme forward end 50 is forced down the incline surface 51 of the lever 52 and under the shoulder 53 and is normally retained in this position by the spring 54.

Attached to the lower end of the lever 52 is an extension part 55 by means of the hinge joint 56. The lever 52 is pivoted at 53'. 57 is a coiled spring which normally operates to move the extension 55 towards the plane of the link 52, (as shown in Fig. 24 in full lines and out of the plane as shown in dotted lines in this figure). Located below the lower end of the extension 55 is a link member 58 which is pivotally connected to the slidable bar 59 at 60. This member is formed with a slot 61 in which is located the bent or lip part 62 of the curved pivoted lever 63. The member 58 is formed with the bent portions 64, 65, and 66. The portion 66, it will be observed, is slightly inclined. The lever 63 is pivotally connected to a support at 67 and is normally retained in its full line position by the spring 68 so that the member 58 is normally retained in the lowered or full line position. The bar 59 is normally retained in its normal position by the spring 69, and the clips 70 support it so that it may slide freely by the extension 55 engaging the turned over or bent end 64. The slidable bar 59 passes through an opening 59' in the curved —T— shaped track section 14'. The opposite end 63' of the lever 63 also extends through an opening $63^2$ of the track section 14'. The end 63' terminates substantially at the center of the horizontal portion of the track section 14 as shown. This end is formed with a flat ledge part $63^4$ onto which the upper rollers 21 and 22 of the food carrier 19 pass when it rolls by gravity down the curved section 14'.

The bar 59 is formed with the two projections or lugs $59^2$ and $59^3$ to which the pins 71 and 72 are secured. Pivotally secured to the fixed support at 73 is the lever 74 having the upper and lower arms 75 and 76. The upper arm 75 has pivotally attached thereto the two —V— shaped carrier stop pieces 77 and 78, each having the two arms 79 and 80. Their pivotal connections with the arm 75 are indicated at 81. The two arms 79 are each formed with a slot 82 to receive the pins 71 and 72 respectively.

The two armed lever 74 is normally retained in an upward position by the coiled spring 83. The lower arm 76 is formed with a flat horizontal tread part 76' onto which the upper rollers 21 and 22 pass when the carrier 19 enters the track section 14 opposite the food delivery window 5, for example. This operation will have the result of lowering or bringing the —V— shaped stop 78 into the path of the food carrier 19 at which point the customer is served. When a food carrier comes to rest on the flat surface 76' of the lower arm 76 its weight will cause the first or other —V— shaped carrier stop 77 to be simultaneously depressed or carried downward into the dotted line position, as shown in Fig. 5. The carrier which is now resting on the lower arm 76' of lever 74 therefore operates, or serves as a stop for bringing to rest a second carrier by causing the —V— shaped member 77 to simultaneously assume its lowered position against the action of the spring 83. Now when the next or a following food carrier arrives, it will be held back by the —V— shaped stop 77; where it rests on the flat ledge part $63^4$ of the lever 63 with the result that its forward or left hand end is thrown upward into the dotted line position shown in Figs. 4, 5, and 22. When this occurs, the inclined surface 66' of the part 66 on the pivoted member 58 will move the lower end of the extension 55 of the lever 52 towards the right hand and the upper end of lever 52 towards the left hand thus moving the shoulder 53 away from the end 50 of the rod 42 permitting the spring 54 to return the lever 52 to its normal or full line position shown in Figs. 4 and 5 and the track sections 10 and 12 into their full line positions, see Fig. 4. The rod 42 is again moved upward by the spring $42^2$, (see Fig. 22).

After the customer has been served at the —V— shaped carrier stop 78 he may push the empty food carrier 19 towards the right hand and away from or off the lower arm 76 of the two armed lever 74 permitting the carrier to move by gravity down the curved track $14^2$. This operation brings about the result of freeing or removing the food carrier at the —V— shaped carrier stop 77 since the stop 77 is simultaneously actuated from the bar 59 to which the stop 77 is connected by means of the pin 71 and ears $59^2$. The carrier at stop 77 is therefore now drawn along from its position, by the operator and onto the flat surface 76' of the lever 74. When the operator moves a carrier at stop 78 he rotates this stop about pin 81 thus sliding bar 59 towards the right hand. This bar will through the pin 71 rotate stop 77 and pull a carrier along on $63^4$ and onto 76'. The spring 69 resets these parts thus again setting the —V— shaped stop 77 in order to bring another carrier to rest at 77.

In the normal operation of the device assume that there is no carrier at the serving window indicated at 5. A carrier arrives which is designed for this window; the part 43 engages 49, as already described, and causes the carrier 19 to pass downward onto the track section 14. If there is not a carrier at this section it simply rolls onto the end $63^4$ of the lever 63 where it is stopped by 77. This operation will throw the pivoted link member 58 upward when the lever extension 55 will be locked by the part 66'. The rod 42 will be locked under the shoulder 53 of the lever 52. When the carrier leaves the end $63^4$ lever 63 will be drawn downward by the spring 68, causing the lever 52 to be unlocked, see Figs. 14, 15, and 16. If a carrier remains on the end $63^4$ of the lever 63 then the lever 52 is locked and another or following carrier cannot be admitted to this section, since it would be held back by the device shown at the upper left hand side of the lever 52 which comprises the following elements: 84 is a wire that is pivotally secured to a support by means of the staples 85, the upper end of which is formed with a crank part 86, and its lower end is secured to a block 87 in which is placed the turnable member 88 having the depending part 89 and the upper bent end 88' which is for elevating the traveling belt 15 when a carrier is not to be moved. When the lever 52 is moved into the dotted line position by the parts 43, 49, 50 and 51 the offset part 90 on the upper end of lever 52 will engage the crank part 86 of the wire 84 and rotate it and the block 87 into the path of a carrier 19 as shown in its dotted position, and, at the same time the bent end 88' is moved to an inclined position beneath the belt 15, (see Figs. 4, 5, and 8). The depending part 89 will then be struck by the part 37 of the carrier and moved into the vertical dotted position, (see Fig. 8) which will operate to prevent the passage of a following carrier by elevating the belt into the wide slot 39. The bent part 88' engages the lower side of the traveling conveyor belt 15 of the rod part 43 after it has acted on part 49 and rollers 21 and 22 of carrier 19 has come to rest on part $63^4$, or, rolled off of this part which will cause the link 58 to operate as already described. The carriers which have been held back by the stop 89 can now proceed along track 8, or, to the opening 5 as desired. Shoulder 66' acts as a release only and not a stop and has, as stated, elevated it into the dotted position, as shown in Figs. 8, 20, and 21. This is caused by the carrier engaging the depending part 89 and raising the bent end 88' since this results in permitting the knots 40 to pass freely through the enlarged slot 39 in the part 37 of the carrier 19, (see Fig. 21). The following carrier that is held back by the stop 89 is now permitted to be drawn along by a knot 40 on the belt 15 onto its designated switch section 12. When the stop 89 is set it is so connected that it may automatically set a stop for the next following carrier which is to come to rest, say at window 5 but for the time being the track at that window is filled. If there is, at this moment, no carrier located on the lever arm 76 of window designated 5, the carrier just released by the stop 89 will pass directly under the elevated —V— shaped stop 77 and onto this lever. The mechanism for carrying out this operation is as follows: 90' designates a slidable bar that is retained in place on a fixed support by the clips 91. 92 is a spring for normally retaining it in the position shown at the left of Fig. 20. The bar 90' is connected to the link 93 with the pin 94 which link is pivotally connected to the bent rod 95 that is secured to the block 96. When a food carrier indicated at 19 in Fig. 21, arrives the parts 41, 42, 52 will operate to set the parts as before described. The knots 40 will engage the plate 37 at the narrow slot 38. The cable 15 will move the plate 37 into the dotted line position 37'. This operation will cause the part 88 to turn in the block 87 and its lower end 89 moved into engagement with the slidable bar 90' as shown in Fig. 21 from its position in Fig. 20, then, as the carrier is moved from the full to the dotted line position the part 37 being in engagement with the part 88' will cause the lower end 89 to move the slidable bar 90' so that the next follow stop, at the extreme left of Fig. 21 will be moved into the dotted line position 96' and the part 88 will assume the position indicated. The blocks 87 and 96' will now be returned to their normal original positions to permit a carrier or carriers to proceed on the main track 8 to their several destinations as windows at 6 or 7. It should be stated that there are two or more stops between each serving opening for the carriers on the main track as there are food stations. The three positions of the parts at "A", "B", and "C" of Fig. 20 shows the beginning and ending of the movement of these parts.

In order to operate the stops on the return track 9, it is necessary that the bar 59 be moved longitudinally. This bar is, as shown in Figs. 1, 4, 5, and 10 loosely connected at its right hand end to a lever 97 by means of the slot and pin construction 98. This lever is pivoted at 98' to a fixed support. A spring 97' normally retains the pin 98 at the left hand end of the slot. The lever 97 is pivotally connected to the lever 99 at 100. This lever is pivotally connected to a fixed support at 101. The lower end of lever 99 is connected to a link 102. This link is connected to the crank part 103 of a rod 104 which is secured to the block 105. The rod 104 is rotatably mounted in the fixed clips 106. Rotatably mounted in the block 105 is a bent rod 107 having the oppositely extending ends 108 and 109. The arm 108 is for engaging and moving the slidable bar 110 which is normally retained in a retracted position by the spring 111. It is slidably attached to a fixed support by the clips 112. The bar 110 is operated in the direction indicated by the arrow 110' by the end 108 of the rod 107 when the block 105 is turned by the rod 104, link 102, levers 99, 98, and bar 59. The crank end 109 is operated at the same time to engage and move the traveling rope 15 downward when it is desired to remove the rope from the narrow passage 38 to the larger one 39 of the carrier 19 to permit knots 40 of the rope 15 to pass freely through the wider slot 39 without moving the carrier when it is desired to hold it back because of other carriers being in their way at the same time. The bar 110 operates to hold back carriers which may be approaching an opening, as 5 from the right hand return track 9, so that a carrier that may at that time be passing down the curved track $14^2$ at the food serving opening 5 to the main return rack 9 can be returned to the supply opening 2. It is necessary to operate carrier stops from the left hand end of an opening as 5, as well as at its right hand end to prevent any interference of the food carriers on the return track. For this purpose the link bar 113 is provided which is connected to the crank part 104'. The link 113 rotates the block 114 by means of the rod 115 which in turn moves the end 116 against the carrier plate 37 and, at the same time moves the traveling rope 15 downward into the dotted position, (see Fig. 10). This operation therefore permits the food carriers at the left hand sides of the opening 5 to be held from being drawn along by the rope. At the same time the end 117 moves the bar 118, link 119, crank $104^2$.

It should be stated that the block 114 may be set or operated either from the next preceding food serving station by the link 113, which station is a duplicate of that shown in Fig. 10, or, the block 114 may be operated from the link 102 and connected parts with 59, (see Fig. 4). A spring 118' normally retains the slide 118 in its normal position.

In order to set the carrier stop devices shown in Figs. 10 to 13 inclusive to hold back a carrier on the return track 9 at a station reference should now be made to Fig. 4. 119' designates a latch which is pivoted at 120. 122 is a spring for retaining the latch in the full line position with its lower curved end 121 connected to the end of the slidable link 102. In the full line position the stop 109 is in a position to permit a carrier to pass along on the track 9. This latch therefore retains the food carrier stops at the different stations in a locked and immovable position. In order to operate the latch 119' and the link 102 the upper rollers 21 and 22 of the food carrier 19 as it passes by gravity down the curved track portion $14^2$, (see Fig. 4) engages the latch 119' and moves its lower end towards the left hand and against the tension of spring 122 and into the dotted line position. Referring now to the operation of the stops on the return track 9 when a carrier is passing down the curved track 14². Assuming the situation of a carrier 19 in stop 78 and resting on member 76' but there is no carrier on the end 63⁴ at stop 77. In this situation the link 58 is in its normal or full line position. Assume a carrier on track 8 is approaching what is intended for the station, lever 52 will be operated by the parts 43, 49, 42 and 51. Since the link member 58 is now in the full line position, the lower end of the extension 55 will simply pass over this link member without engaging the same, and, therefore, the bar 59 will not be moved or operated. The same operation would occur if there was no carrier at all at this station.

Assume now the condition that there are two carriers at this station at stops 77 and 78 respectively; one resting on 63⁴ and the other on 76'. Link 58 will now be held in the raised dotted line position. When a carrier intended for this same station arrives on track 8 it will operate lever 52 as before. The extended part 55 will engage the end 64 and slide or move the bar 59 towards the right hand. This operation will through the pins 71 and 72 simultaneously turn the stops 77 and 78 and move the two carriers onto the curved track 14². The lever 63 will now assume its normal position. Lever 52 is now in its dotted line position. When this action is taking place, the carrier on the main track that is about to come down to the station on track 12 causes the operation of the parts associated with the lever 52. When this third carrier reaches —V— shaped stop 77 on lever 63⁴, it will, through the link 58 reset the lever 52. This operation, therefore, moves one carrier from lever 63 and then occupies the same space for itself. In order to permit a carrier at one of the serving openings, as 5, to pass freely down the curved track 14² onto the return track 9, the vertically operated carrier stop 123 is normally held in its lowered position by the spring 124, see Fig. 4. This is accomplished by the pivoted track section lever 125 that is pivoted at 126. Its left hand end is normally down in the full line and right hand normally up in dotted line. A latch 127 will retain the lever 125 in its dotted line locked upward position by means of the notched end 125' in the end of lever 125 and spring 127'. The lever 125 is pivotally connected to the carrier locking bar 123 at 128. When the rollers of the carrier pass down the curved track 14² its weight forces the curved switch 13 downward into the full line, and forces the track section 11 downward into the dotted line. This operation permits the carrier from opening 5 to pass onto the main return track 9 where it is caught by the rope 15 and returned to its starting point. When the curved section of track 13 is lowered the section 11 is also lowered by means of the link connection 111' into the dotted position. In order to permit any carrier on the main return track 9 to proceed a guide rail 111³ is provided for the roller to run on. The spring 111² will return the track section 111 to its normal full line upward position after a carrier has been moved over the same. The tension of the spring 111² is such that it is slightly stronger than the weight of the parts 11 and 13. When a carrier is passing on the track 9, with the stop 123 down, it will engage the right hand end of lever 125, and force the left hand end upward against the tension of spring 124. This will permit a carrier on track 9 to return and prevent a carrier on track 14 from passing down track 14². Should a carrier arrive at station 5 on the return track 9 it will pass this station by engaging the guard rail 111³ without being derailed. The rail section 11 is at this instant in its lowered or dotted position. When the carrier runs onto the guide rail its rollers will engage the under side of the rail section 11 and immediately raise or elevate the same into the full line position which will be in alignment with the rail 9 thus permitting the carrier to proceed past station 5 for example.

What I claim is:

1. In a serving apparatus, the combination with a main trackway formed as a loop, a plurality of serving stations, shunt tracks leading to the stations, a food conveying carrier adapted to travel on the trackway, means for directing the carrier to any one of the several stations and independent of the other stations and comprising a pivoted lever formed with an inclined surface and a locking shoulder, a shaft rotatably mounted, a rod attached to the shaft for engaging the inclined surface of the lever and the shoulder for moving the same when the shaft is rotated, a depending part on the shaft, an adjustable arm on the carrier designed to engage the part, means for moving the carrier whereby when the carrier is moved against the said part, the shaft and the lever will be operated and locked, a pivoted section in the main track, a pivoted section in the shunt track, and cooperating means between the shaft, the lever, and the sections for retaining the sections in place when a carrier moves onto the shunt track.

2. In combination, a main trackway having an outgoing and a return portion, a carrier designed for travel thereon, a serving station, a trackway leading thereto, a pivoted section in the main trackway and in the trackway leading to the serving station, said sections being connected together for simultaneous motion, an adjustable arm member on the carrier, a shaft, a depending part on the shaft and located in the path of the arm member on the carrier for operating the shaft, connecting means between the shaft and the sections, a lever having an inclined surface and a shoulder portion, a rod on the shaft for operating the lever when the rod is moved against the inclined surface and into engagement with the shoulder and a carrier stop mechanism operated by the lever for preventing the passage of carriers on the main trackway, when a carrier is in the serving station.

3. In a self service apparatus, a main track having outgoing and return portions, a plurality of service stations, a section of track located at each of the stations, said sections of track being arranged between the outgoing and return portions of the track, movable track sections attached to the track portions to receive a carrier from the main trackways, means for operating the track sections which cooperates with the outgoing main trackway to move the track section into alignment with the main trackway for directing a carrier to a station, each of said sections being operated by the carrier, adjustable means on a carrier for determining which track section will be operated by the carrier, means for preventing a carrier entering a track section after a predetermined number of carriers have already entered the track section, means for permitting the carrier to leave the track section and be moved onto the main return trackway, and means for preventing the carrier from moving on the main trackway when a carrier is leaving the track section.

4. In combination, a pivoted lever, a link member operated from the pivoted lever, the link member having an elongated slot to permit the lever to move thereon, a slidable bar to which the link member is pivotally attached, the link member having oppositely located portions to receive the end of a second lever for operating the said bar, the second lever being actuated by a movable carrier, the carrier being designed to actuate the first mentioned lever and to actuate the link member to lock the second mentioned lever, the construction and arrangement being such that when the first mentioned lever is actuated the second mentioned lever will be released.

5. A service apparatus for the purpose described comprising, in combination, an outgoing and returning looped trackway, a carrier designed for movement on the trackway, an endless cable for actuating the carrier, the carrier having a plate that is formed with slots of different dimensions to receive the cable, projections on the cable for engaging one of the slots for either operating or freeing the carrier against movement on the trackway, means actuated directly by the carrier for disengaging the cable from the narrow slot to permit it to move freely through the wide slot, whereby the carrier is prevented from moving on the trackway, said means comprising a pivoted lever formed with a projection, a rotatable member having a part thereon which is engaged by the projection on the lever for rotating the member, cooperating means between the member and the lever, means actuated by the member for engaging the rope or conveyor for elevating the same, when the carrier is to be held against movement.

6. In a self serving apparatus, the combination, an outgoing and returning looped track portion, a carrier adapted for movement on the track portions, an endless cable for actuating the carrier, a plurality of serving stations, an S-shaped section of track which extends vertically from one track to the other with the main outgoing and returning portions at each station, a section of the main track having a pivoted part at the entrance end and a pivoted portion at the exit end of the outgoing and returning portions of the track, means actuated by a carrier on the outgoing movement for moving the pivoted section in the main outgoing portion whereby the carrier may be directed onto the cross connected track section, adjustable means on the carrier for determining to which station the carrier will be shunted or directed by the cross sections.

7. In combination, a shunt track section, a two armed lever pivoted adjacent the track section, the lower arm being designed to receive a carrier, the upper arm having —V— shaped carrier stop devices pivotally attached thereto, a slidable bar, pins mounted on the bar for operating the stop devices, a second lever terminating near the lower arm of the two armed lever, the second lever being pivotally connected to the sliding bar by means of a link having an elongated slot to receive a portion of the second lever, the link member having a plurality of shoulders, an operable lever for engaging the shoulders, said operable lever being actuated by a carrier and other means actuated by the carrier for directing the carrier onto the track section and also onto the second mentioned lever where it is retained by a —V— shaped stop and in case a second carrier is directed onto the second mentioned lever the carrier thereon will be moved onto the two armed lever, and the —V— shaped members moved to a carrier locking position, as described.

8. In combination, a trackway, a carrier therefor, comprising a plate, rollers carried by the plate for engaging the trackway, an upwardly extending part on the plate formed with a slot having parallel side edges of different widths and depths, an endless conveyor having projections for engaging the side of the plate, or, for passing through the wider and upper part of the slot, for the purpose of moving the carrier along the trackway, or releasing said carrier.

9. In combination, a lever formed with an inclined surface and a locking shoulder, a rockable shaft, a rod secured to the shaft for engaging the inclined surface for moving the lever and after it leaves said surface to engage the shoulder, and means for operating the shaft, comprising a carrier, a track for the carrier, a cable for moving the carrier on the track, a part on the carrier for operating the rockable shaft, and means operated by the carrier for releasing the rod on the shaft from the shoulder.

10. In combination, a lever, an extension pivotally connected thereto, a pivoted link member formed with a locking part for the extension, a lever connected to the link member, a trackway through which the lever passes, a carrier for the trackway and engaging the lever for disengaging the extension from the locking part.

11. In combination, a looped trackway, a plurality of service stations, carriers on the trackway, a cable for operating the carriers, means for independently directing different carriers to different stations, and means for automatically preventing the different carriers from interfering with each other on their return, means comprising a series of connected links, crank members operated by the links, bearing blocks operated by crank members, two armed members pivotally mounted in the blocks for engaging the cable for moving the same away from the carriers to render them inoperative, as described.

12. A serving device comprising a looped track, carriers thereon, a cable for operating the carriers, means for simultaneously disengaging the cable from one or more of the carriers, consisting of a lever engaged by the carrier, which in turn operates a part that lifts or depresses the cable away from the carrier depending whether the carrier is outgoing or returning.

13. In combination, in a self serving apparatus, a main and return track, a carrier, a serving station between said tracks, a lever at the station onto which a carrier is adapted to run, a second lever at the station, a carrier stop device movably attached to the second lever for retaining a carrier at rest on the first lever.

14. In combination, in a self serving apparatus, a main and return track, a carrier, a serving station between said tracks, a lever at the station onto which a carrier is adapted to run, a second lever at the station, a carrier stop device movably attached to the second lever for retaining a carrier at rest on the first lever, and means for operating the second lever for moving a carrier from the first lever and from the stop.

15. In combination, in a self serving apparatus, a main and a return track, a serving station, a carrier for the track, means for directing a plurality of carriers to the station, means for retaining the carriers at the station, and means for automatically removing the carriers from the station when an additional carrier is directed to the station and itself is stopped at the station.

16. In combination, in a self serving apparatus, a looped track having main and return portions arranged one above the other, a plurality of serving stations along the lower track, carriers adapted to run on the track portions, means for moving the carriers on the track portions, laterally movable adjustable means on the carriers for directing different carriers to different serving stations, means for preventing a carrier from leaving a service station when one is passing that station on the return track portion.

17. In combination, in a self serving apparatus, a looped track having main and return track portions arranged one above the other, a plurality of serving stations along the lower track, carriers adapted to run on the said track portions, an endless cord means for moving the carriers on said portions, laterally movable means for directing different carriers to different stations, means for preventing a carrier from leaving a station when a carrier is passing that station on the return track portion, said means comprising a slidable bar, a lever attached to the bar and located on the return track portion, and means for returning the bar to its normally inoperative position.

18. In combination, in a self serving apparatus, a looped track having main and return track portions, a serving station, a shunt track section, connecting the serving station with the main and return portions, which is normally disconnected from said portions, a carrier, means operated by the carrier itself for connecting the shunt track section of the serving station to the main and return track, and means operated by the carrier to prevent a second carrier from entering the station until the first one in the section is removed from the station.

19. In a self serving apparatus, the combination, of a main and return track, a carrier adapted for movement thereon, means for operating the carrier, a serving station, two levers at the station, one being —U— shaped to provide a tread part for a carrier to engage and rest thereon and a part for attaching carrier stop devices to the same, the other lever having a tread surface for the carriers to engage and rest thereon, means controlled by the second lever for removing the carriers from the serving station, and means operated by a carrier for operating the carrier removing means from the station.

20. A device for the purpose described, comprising in combination, a receiving station, a member to receive a carrier, means for retaining the carrier on the member, a link pivotally connected to the member, a main track for the carrier, means for directing a carrier from the main track to the station, means operated by the carrier to remove a carrier already on the member therefrom by the following carrier, and means for resetting the carrier retaining means after a carrier has been removed.

21. In an apparatus for the purpose described, a receiving station, two pivotally attached members, each having a flat part to receive a carrier, —V— shaped carrier stop devices pivotally attached to one of said members, a slidable bar for operating the said stop devices, the other of said members being operatively connected to the bar, means for operating the carrier, means actuated by the carrier for operating the carrier, means actuated by the carrier for operating the bar to cause the removal of a carrier which may be located on the other said member in order to make room for itself to rest on the flat part, and means for returning the bar to its normal position.

GEORGE POSNICK.